US006718349B2

(12) United States Patent
Weedon

(10) Patent No.: US 6,718,349 B2
(45) Date of Patent: Apr. 6, 2004

(54) INTELLIGENT, OPTIMISTIC CONCURRENCY DATABASE ACCESS SCHEME

(75) Inventor: Jonathan K. Weedon, Half Moon Bay, CA (US)

(73) Assignee: Borland Software Corporation, Scotts Valley, CA (US)

( * ) Notice: Subject to any disclaimer, the term of this patent is extended or adjusted under 35 U.S.C. 154(b) by 286 days.

(21) Appl. No.: 09/737,122

(22) Filed: Dec. 14, 2000

(65) Prior Publication Data

US 2002/0116403 A1 Aug. 22, 2002

(51) Int. Cl.[7] .............................................. G06F 17/30
(52) U.S. Cl. .............................. 707/201; 707/8; 707/10
(58) Field of Search ............................... 707/10, 8, 201

(56) References Cited

U.S. PATENT DOCUMENTS

| 5,926,816 A | * | 7/1999 | Bauer et al. ................. 707/201 |
| 6,169,794 B1 | * | 1/2001 | Oshimi et al. ........... 379/201.01 |
| 6,226,650 B1 | * | 5/2001 | Mahajan et al. ........... 379/93.12 |
| 6,393,419 B1 | * | 5/2002 | Novak et al. .................. 707/10 |

OTHER PUBLICATIONS

The PowerTier™ Server—A Technical Overview and Appendix A (7 pgs.).
Persistence PowerTier for C+ +—Marketing Brochure (2 pgs.).
Persistence PowerTier™ 6 for EJB (2 pgs.).
Persistence—Transactional Application–Server Technology—Unlock Your Relational Database for High–Performance, Distributed Applications (8 pgs.).
Shailesh Agarwal, Ph.D and Arthur M. Keller, Ph.D., Architecting Object Applications for High Performance with Relational Databases (14 pgs.).
Persistence Marketing Materials (5 pgs.).
Thought, Inc.—CocoBase Enterprise—What is Database Mapping? (10 pgs.).
Thought, Inc.com Web Pages (13 pgs.).
Webgain.com Web Pages (7 pgs.).
Webgain Marketing Material (2 pgs.).
eXcelon Software: Javlin Product description (6 pgs.).
Gemstone.com Marketing Materials (5 pgs.).

* cited by examiner

Primary Examiner—Wayne Amsbury
Assistant Examiner—Cam-Linh Nguyen
(74) Attorney, Agent, or Firm—Darby & Darby

(57) ABSTRACT

Methods for minimizing conflicts in an optimistic concurrency database access scheme are described. The method provides users or software processes with cache copies of database records and tracks which data items in the cache copy were modified and whether they were read, or read before ever being modified. A decision is then made using this information as to whether the current transaction can be committed to the database. The inventive scheme engrafts intelligence to the commitment decision process and accommodates many transactions which prior art schemes consider as conflicting. Consequently, the inventive method increases throughput in such systems.

21 Claims, 4 Drawing Sheets

INTELLIGENT, OPTIMISTIC CONCURRENCY DATABASE ACCESS SCHEME

FIELD OF THE INVENTION

The present invention relates to database accessing schemes and more particularly to methods for minimizing transactional incompatibilities for heavily concurrent data access among multiple users.

BACKGROUND OF THE INVENTION

In highly concurrent systems it is often desirable to cache parts of the database in a middle tier. This capability is often provided by an object/relational (O/R) engine, which as well as caching, also provides an object model on top of the relational data model. As with any caching architecture, the goal is to off-load a central resource, and provide data access in the middle tier without overly burdening the database.

Such a caching mechanism works extremely well for data which is only being read. However, for data which is being modified (and in particular for cases of heavy concurrent modification) there is a potential for conflicts. That is, if there are multiple caches containing the same database information, and there are multiple concurrent updates to those cached copies, there is the potential for one update to be incompatible with another.

There are two basic approaches to solving this problem, which are referred to as pessimistic concurrency and optimistic concurrency. In pessimistic concurrency, it is assumed that conflicts may arise, and therefore it is never possible to have more than one modifiable copy of a given piece of data. Unfortunately, this requires that data access be serialized, and therefore this solution dramatically reduces the throughput of a heavily concurrent system.

The other approach is to use optimistic concurrency, which allows multiple modifiable copies to exist, and then requires that conflicting updates be detected subsequently. There are a number of existing solutions as to how to provide optimistic concurrency, which all use a variant of a "version number." That is, every time an update is made to the database, some kind of versioning information associated with that record is used to verify the consistency of the attempted update against the version already in the database. So, when a record is initially read from the database, the current values of the data record as well as its version number are stored. Subsequently, when it is time to update the record in the database, the update is only allowed to replace the current data in the database record if the version number has remained unchanged from when the record was initially read. Simultaneous with the database update, the version number associated with that record is also updated in the database. However, if the system detects that the version number has changed, the update is disallowed.

Reliance on version numbers, however, can result in "false" conflicts which occur because the version number is updated if any field in the record is updated, whereas it may be that only compatible subsets of fields were updated. In the case of a concurrent compatible update, there is in fact no conflict. However, a pure version number scheme will detect a conflict in this situation.

What is needed in the art is an intelligent scheme for concurrent optimistic access to a database which proactively eliminates false conflicts. The present invention satisfies this and other needs.

SUMMARY OF THE INVENTION

According to one aspect of the present, invention, a method is provided for minimizing conflicts in an optimistic concurrency database access scheme. The method includes the steps of permitting multiple users to access a data record concurrently, generating concurrent cache copies of the data record for each user who accesses the data record, each cache copy including an initial value for each of the data items which is correlated to the value in the data record, permitting each user to perform a transaction on their respective cache copies, tracking which data items were modified and whether they were read for each of the user transactions, and, for any transaction that includes modified data items, committing the transaction if no data item has been read, and committing the transaction if the data items that were read contain the same value as the initial value. In a more complex scheme, if desired, transactions can be committed only if the data items that were read satisfy the further criterion that said data records were read before any modification.

In a further aspect of the present invention, another method for minimizing conflicts in an optimistic concurrency database access scheme similarly permits multiple users to access a data record concurrently, generates concurrent cache copies of the data record for each user who accesses the data record, each cache copy including an initial value for each of the data items which is correlated to the value in the data record, and permits each user to perform a transaction on their respective cache copies. For each data item in the transaction, the method can use a first bit to track whether the data item was modified and a second bit to track the occurrence of a first prescribed operation relative to a second prescribed operation on the data item. For any transaction that includes modified data items, the transaction is committed in response to at least one predetermined criterion. The first and second prescribed operations can be, for example, a read operation and a modify operation. The prescribed criterion can be that the data items that were read contain the same value as the initial value, or that no data item has been read, or one or more other criteria, alone or in combination.

In yet a further aspect of the invention, the methodology is recited in terms of the steps that are required to perform as series of prescribed functions. That method minimizes conflicts in an optimistic concurrency database access scheme through a step for permitting multiple users to access a data record concurrently, a step for generating concurrent cache copies of the data record for each user who accesses the data record, each cache copy including an initial value for each of the data items which is correlated to the value in the data record, a step for permitting each user to perform a transaction on their respective cache copies, a step for tracking for each transaction which data items were modified and whether they were read, and, for any transaction that includes modified data items, a step for committing the transaction if no data item has been read, and a step for committing the transaction if the data items that were read contain the same value as the initial value.

These and other steps, features, aspects, and advantages of the invention will be apparent from the accompanying Drawings and Drawing Descriptions and the Detailed Description of Certain Preferred Embodiments.

BRIEF DESCRIPTION OF THE DRAWING FIGURES

DETAILED DESCRIPTION OF CERTAIN PREFERRED EMBODIMENTS

By way of overview and introduction, the present invention provides an intelligent scheme for minimizing conflicts among multiple concurrent database transactions. The inventive scheme logically deducts transaction scenarios that can be committed free of conflict and commits those transactions. Several deduction schemes are disclosed, each of which permits greater throughput than prior art schemes which rely on version numbers. The inventive method can perform logical deductions to minimize conflicts with a footprint as small as one bit of information for each data item that can be modified. hi more complex deduction schemes, the inventive method uses two bits of information in conjunction with a comparison between values in a cache copy and values in the data record (which may have been updated by other users interacting with their own cache copies of that data record). The comparison can be made between the data items themselves to see if they have been modified, or with regard to a hash of the value (or quantity) of the data items to achieve the comparison in a computationally efficient way.

Figure 1:
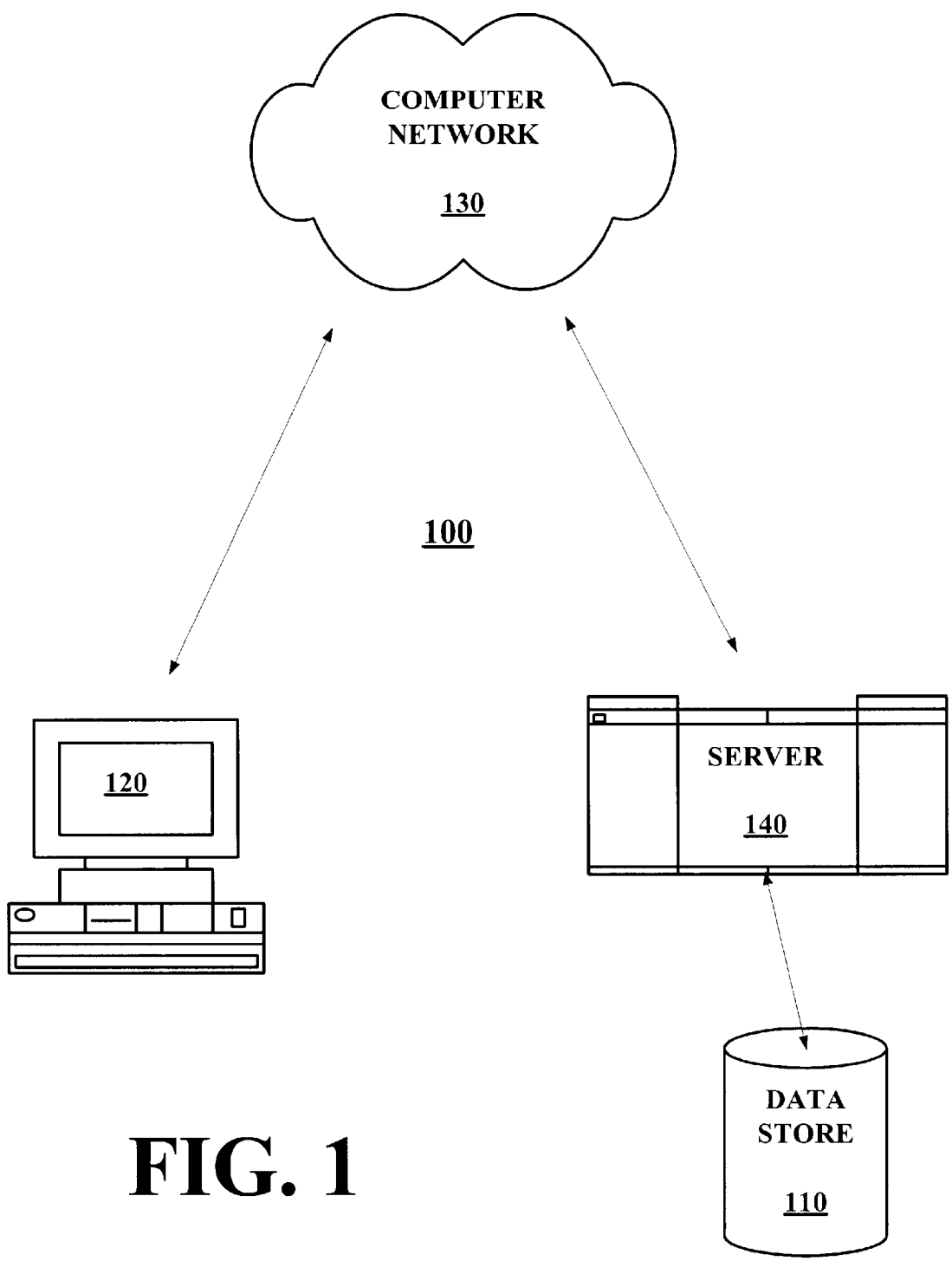
FIG. 1 illustrates a network arrangement 100 that can be used to implement the method of the present invention.

Typically, a data record includes a number of data items, each having a value either by default or by assignment in response to a user action. A great number of data records are stored in a database. FIG. 1 illustrates a network arrangement 100 in which a database 110 holds a plurality of data records. The network arrangement 100 forms no part of the present invention, but rather is illustrated to show one possible environment in which the database access scheme of the present invention can be used.

A plurality of users at respective client machines 120 access the database 110 through two-way communications with a computer network 130 in any conventional manner. The computer network 130 can be a distributed computer network such as the Internet, a wide area network, a local area network, and the like. Concurrent requests for the same data record from multiple users can be processed by a server 140, or by middle-tier software resident at the server 140 or elsewhere.

Each user at a client machine is provided a cache copy of a data record which can be read and modified at the user's discretion. All modifications to the values of the data in the data record, however, are held strictly within that cache copy. Only when the user has completed a transaction, are the modifications, if any, provided to the database so that the data record can be updated.

A "user" should be understood to be a person at a client machine 120, or an automated process (e.g., software routine) configured to access the database for any one of a number of reasons. The term "modify," "modification" and other forms of that word refer to the changes proposed by a user or process which, because of potential conflict with other concurrent users of that data record, have not been committed to the data base. The term "update" or "record" or "store" in their various forms refers to a change in the values of the data items contained in the data record which is maintained in the database 110. Thus, once a transaction commits, the modifications in the cache copy are updated to the data record in the data base.

If a transaction commits, then each of the modifications to the data items is updated to the database. The first concurrent transaction will always commit because it is necessarily conflict free. On the other hand, if a transaction is disallowed due to conflict, none of the modifications are stored in the database, even if one or more data items within the cache copy could be included in the data record without conflict.

Figure 2:
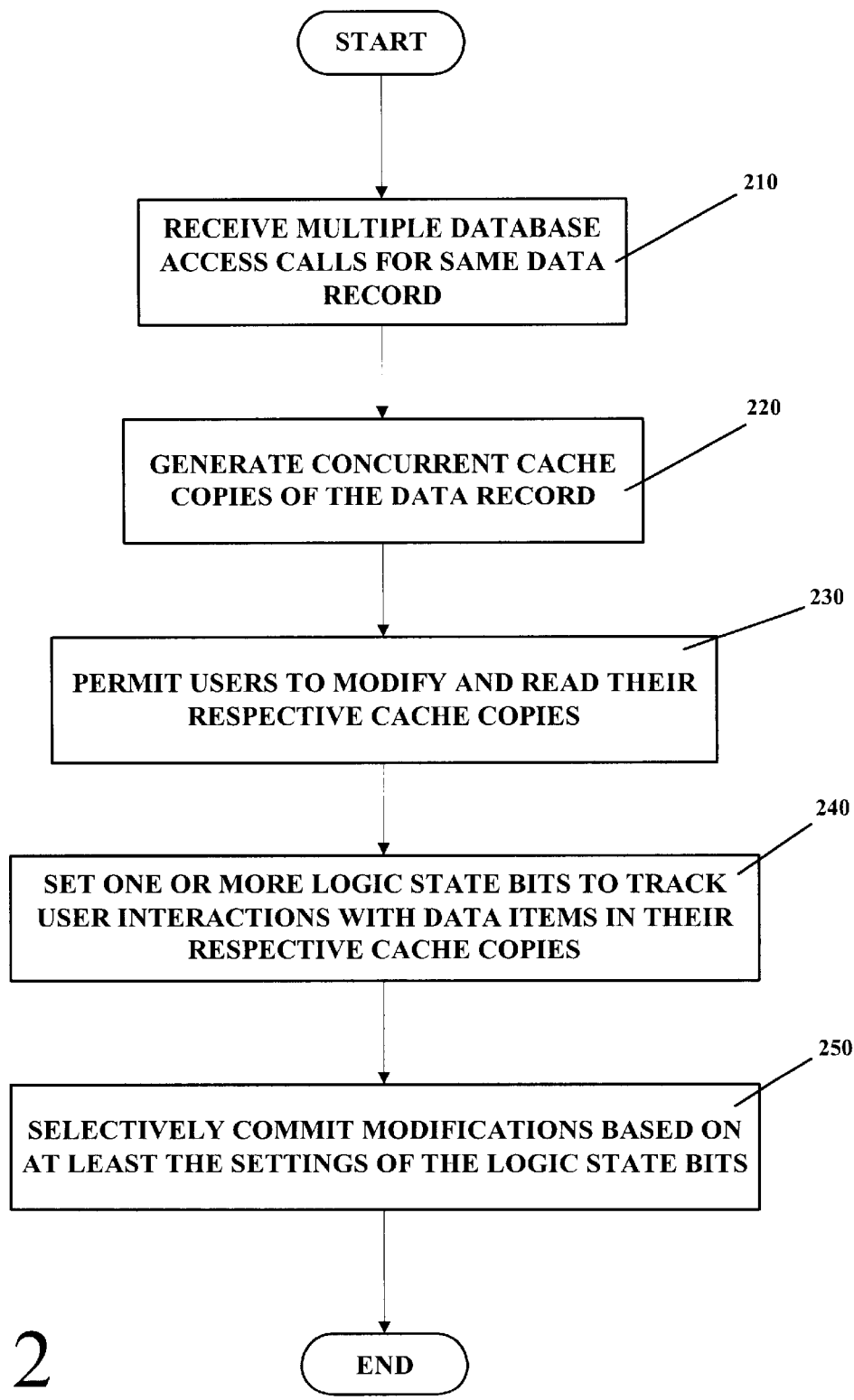
FIG. 2 is a flow diagram of the intelligent scheme for minimizing conflicts among multiple concurrent database transactions in accordance with the invention.

With reference now to FIG. 2, a method in accordance with a first preferred embodiment is described. At step 210, the database 110 receives multiple, concurrent access calls for the same data record from a plurality of users. As noted above, the access calls can originate from client-side machines 120, from the server 140, or from a remote, automated process running on another machine in operative communication with the database 110. The data record includes one or more data items, each of which has a stored value, whether by initialization, default, or setting by a user or process. For example, a data record can contain information related to a particular employee and can include as data items the employee's "name," "address," "picture," "salary," and other relevant information. The "values" are the actual name, address, picture, salary, and other relevant information that populate the data record for each employee. In response to each access call, a cache copy of the data record is created, as indicated at step 220. The cache copy includes a set of data items contained in the data record (and includes as initial values the values that were in that data record when the access call was made, or values that can be correlated to the values in the database using a prescribed algorithm).

The cache copy need not include all of the data items in the data record. For example, one user may not be provided with "salary" information and another might not be provided with the employee's "picture." The basis governing which data items are provided to a given user forms no part of the present invention.

As indicated at step 230, each user is permitted to perform a transaction on their respective cache copies. A "transaction" includes one or more interactions with the data items in the cached copy, such as requests to read/display the value of a data item and changes to the value of a data item, and modifications to data values (which encompass changes to new values as well as changes-back to the prior value within the same transaction). There can be a series of interactions during the course of a transaction (see, e.g., transactions T1 and T2 described below), and, in accordance with the first preferred embodiment, middle-tier software tracks those interactions and stores a bit B1 denoting which data items in the cached copy were modified and a bit B2 denoting whether those data items were read before being modified. At step 240, the logic state bits B1 and B2 are set either to "1" or "0" (the choice being arbitrary) in order to track each user's interactions with the data items in their respective cache copy of the data record.

Using at least the settings of the logic state bits, the software method identifies which concurrent transactions can be committed to the database (no conflict), and which ones cannot (due to conflict). At step 250, the modifications made by a given user are selectively committed to the database in view of at least the logic state bit settings.

Figure 3:
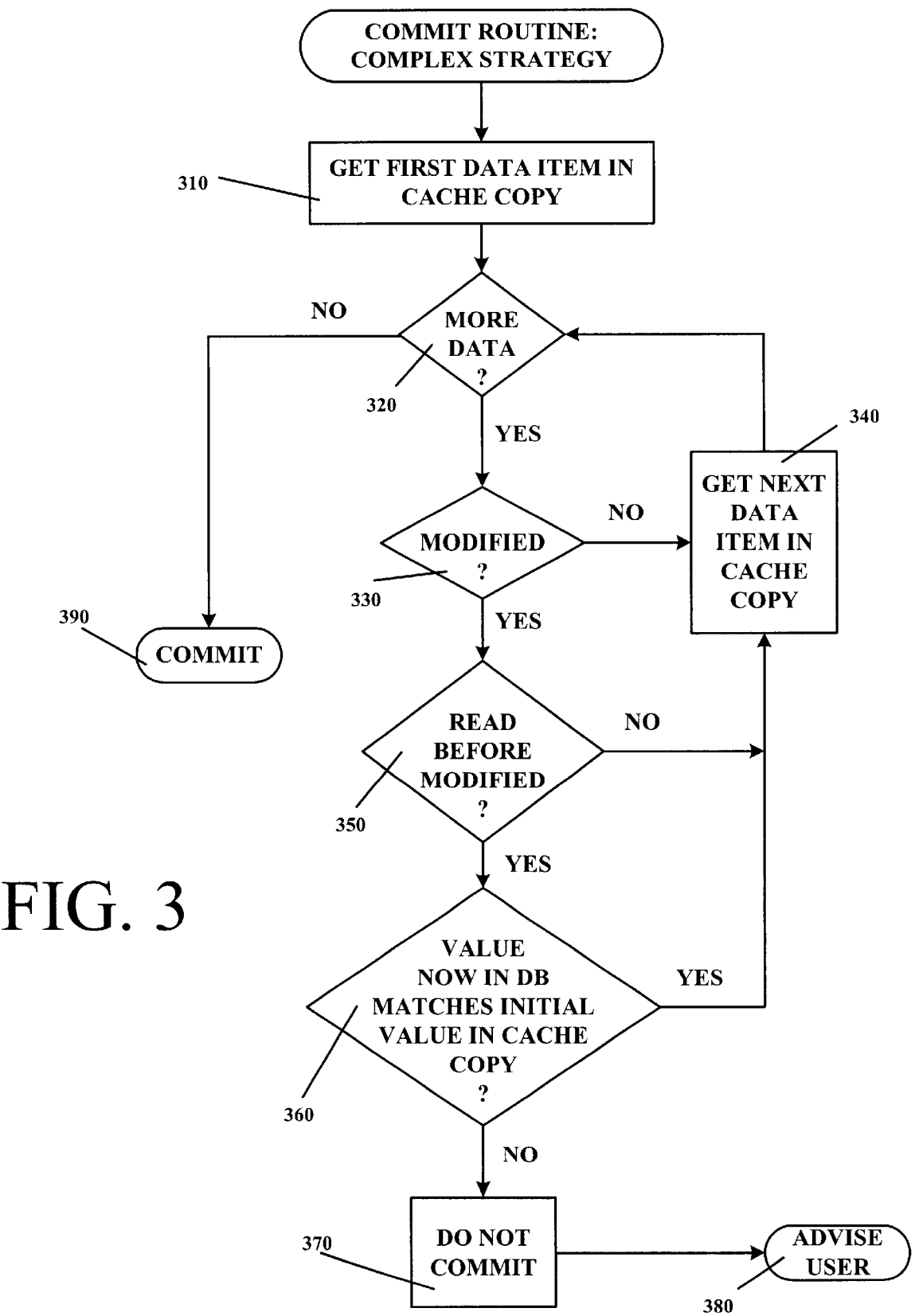
FIG. 3 is a flow diagram of a complex strategy for determining whether to comment on update in accordance with a first preferred embodiment of the invention.

FIG. 3 describes a process flow for the first preferred embodiment of the present invention, in which the decision as to whether modifications are to be committed to the database further includes a comparison of the initial value of the modified data items in the cache copy to the value stored in the database at the time of the proposed commitment. The process flow illustrates the concept of using logic state bits B1 and B2 in conjunction with data comparison in deciding whether to commit. A preferred coding arrangement has all of the tests made in a single, logical operation at one time. The process flow of FIG. 3 provides a representation of the operations being performed in a stepwise manner, but is impractical from an implementation standpoint because the values maintained in the database for a given data record might change during the process flow of FIG. 3 as another transaction is being committed.

With reference now to FIG. 3, the data items in the cache copy are examined, for example, one after another, starting with the first as indicated at step 310, until a test at step 320 indicates that there are no more data items to examine. Each is examined first to determine whether the value of the data item has been modified, as indicated at step 330. This examination is preferably performed by looking at the value of bit B1 without reference to the value of the data item itself, but can be performed without the use of B1 by looking at the value or a hash of the value of the data item in an alternative mode of operation. If the data item has not been modified, then that data item would present no conflict were the transaction to be committed. If that data item has not been modified, then the next data item in the cache copy is obtained (at step 340) and examined in the same way, until all data items in the cache copy have been examined.

In the event that one or more of the data items has been modified (i.e., B1=True for one of these data items), then a test is made at step 350 to determine whether that data item was read before being modified (i.e., is B2=True?). This determination can be made by tracking the sequence of interactions that the user makes with the cache copy, but more preferably is performed by looking at the value of bit B2. If the data has been read before being modified, that suggests that the user (or a process) may have relied on the value of the data that was read. For example, if the data record concerns a bank account and the "checking account balance" field were read before being modified, there is an inference that something about the value in that field may have been important to the decision to modify the value.

If the data item was not read before being modified, then there is no basis for an inference of reliance on the part of the user/process, and so the next data item can be examined, as indicated by the loop back to step 340. On the other hand, if the data item was read before being modified, then a determination is made as to whether the transaction conflicts with the present state of the database. Specifically, at step 360, a comparison is made between the value of the data that is presently in the database 110 to the initial value that was in the cache copy, that is, the value that was provided to the user when the cache copy was made. The comparison of the "values" is meant to include a comparison of the hash of the value, so, for example, two image files do not have to be compared bit-by-bit. If there is no conflict (the comparison results in a match), then the next data item is obtained by the loop back to step 340. If there is a conflict, then the transaction is not committed, as indicated at step 370, and the user/process is advised that there was a conflict with an already-committed concurrent transaction, at step 380.

If there are no more data items to examine at step 320, and if the process has not terminated by way of steps 360–380, then the transaction is committed at step 390. It should be noted that if a particular data item is not read during a transaction, or if it is read after its value has been modified, there is no possibility of reliance on the value in the database at anytime, and no impediment presented by that data item in committing the transaction, although the other data items still may indicate a conflict.

Consider, for example, a data record containing data items A, B, C, D, E. Before the concurrent transactions, these data items have the following values:

A: 10

B: 20

C: 30

D: 40

E: 50

Now consider a simple example in which there are only two concurrent transactions, T1 and T2, wherein separate users interact with respective cache copies of the data record as desired or required. The transactions include a series of interactions performed in the order indicated below:

|  | Transaction T1 | Transaction T2 |
| --- | --- | --- |
| First | print(A); | print(A); |
| Second | print(B); | print(B); |
| Third | B = 21; | print(C); |
| Fourth | C = 31; | print(D); |
| Fifth | print(C); | print(E); |
| Sixth | D = 41; | C = 32; |
| Seventh |  | D = 42; |
| Eighth |  | E = 52; |

The complex strategy of FIG. 3 is implemented using the bits B1 and B2, discussed above, for each data item in the data record. More particularly, B1: denotes which data items in the cached copy were modified, B2: denotes whether those data items were read before ever being modified.

Bit B1 thus advises the method that a cache copy has been modified, and that the transaction is to be examined and committed to the database provided that there are no conflicts with any other concurrent transaction. Bit B2 tests for the situation in which the concurrent user may have relied upon the contents of the data in the database in performing the transaction. If the data were read before being modified, an inference is made that the user has relied on the values that were read. Bits B1 and B2 are used in the process of FIG. 3 to update the data record, when, for each item in the cache copy where (B1) is true (i.e., there was a modification as tested at step 330), any items in the data record which were read before being modified (B2: True, tested at step 350) have the same value in the cache copy as the value in the database at that time (tested at step 360).

A concurrent transaction can only commit if it presents no conflicts to the data record maintained by the database. A first concurrent transaction can always commit, but raises potential problems with subsequent concurrent transactions.

First we consider the situation in which transaction T2 commits first (necessarily, free of any conflicts). As a consequence of T2 committing, the database is updated to reflect the following values:

|        |      | (After T2 Commits) |
|--------|------|--------------------|
| A: 10  |      |                    |
| B: 20  |      |                    |
| C: 32  |      |                    |
| D: 42  |      |                    |
| E: 52  |      |                    |

To determine whether transaction T1 can commit, we look at the values of bits B1 and B2. Examination of the sequence of interactions shown above for T1 yields the following states for logical state bits B1 and B2:

| T1 | | |
|----|----|----|
| A: | B1: False | B2: True |
| B: | B1: True  | B2: True |
| C: | B1: True  | B2: False |
| D: | B1: True  | B2: False |
| E: | B1: False | B2: False |

In particular, the value of (A) is printed, but not updated, so (A:B1) is false. The data item (A) is read, however, before any modification is made, and so (A:B2) is true. Data item (B) is read and so (B:B1) is true. Data item (B) is also read before it is modified (see the second and third interactions), and so (B:B2) is true under the logic of the complex strategy of FIG. 3. Data item (C) presents a different scenario of particular importance in comparing the complex strategy of FIG. 3 with the intermediate strategy of FIG. 4, discussed below. Data item (C) is modified in step four and is not read until after it has been modified. Thus, (C:B1) is true but (C:B2) is false under the logic of the complex strategy of FIG. 3.

Transaction T1 modifies (B, C, and D) and reads (A and B) before any modification. Transaction T1 can commit and cause the database to be updated to the values (B=21, C=31 and D=41) if the present value of (A and B) in the database are still (10 and 20). Because transaction T2 did not change the values of (A or B), transaction T1 can and does commit.

Consequently, transaction T1 is concurrently compatible with transaction T2 when T2 commits first. Transaction T1 is compatible with a number of other concurrent transactions in which any of (C, D, E) was modified in other cache copies. The database values after committing T2 and T1 are shown below under the column "T2 Commits First."

|    | T2 Commits First | T1 Commits First |
|----|------------------|------------------|
| A: | 10 | 10 |
| B: | 21 | 21 |
| C: | 31 | 31 |
| D: | 41 | 41 |
| E: | 52 | 50 |

Next we consider the situation in which transaction T1 commits first (and, necessarily, free of any conflicts). The database values after committing transaction T1 are shown above under the column "T1 Commits First." As a result of T1 committing, data items (B, C, and D) are assigned the values (21, 31, and 41). The later transaction, T2, seeks to modify (C, D and E) to have the values (32, 42, 52). But the user in transaction T2 has viewed the contents of all of the data fields (A, B, C, D, and E), namely the cached values (10, 20, 30, 40, 50) before attempting to modify fields (C, D and E). We again examine the sequence of interactions for T2 to determine the values of the logical state bits B1 and B2 in order to determine whether transaction T2 can commit after T1. The values of B1 and B2 are:

| T2 | | |
|----|----|----|
| A: | B1: False | B2: True |
| B: | B1: False | B2: True |
| C: | B1: True  | B2: True |
| D: | B1: True  | B2: True |
| E: | B1: True  | B2: True |

With regard to data fields (B and C), the user saw the values (30 and 40) in the cache copy of the database record. Those values are no longer valid due to transaction T1 having committed and having been updated to (31 and 41). Accordingly, steps 330 and 350 both assess as "YES" while the test at step 360 fails ("NO"), causing the transaction T2 to be marked as conflicting and not committed. Thus transaction T2 is not concurrently compatible with transaction T1 when T1 commits first.

In a second preferred embodiment of the invention, an intermediate strategy is used to reduce conflicts among concurrent transactions. The intermediate strategy provides needed improvements in the art of optimistic concurrency database access, is simple to implement, but rejects more transactions than the complex strategy because it assumes that if the value of a data item is read, there is reliance. Specifically, in lieu of bit B2, the intermediate strategy uses a bit B3 together with bit B1:

B1: denotes which data items in the cached copy were modified, and

B3: denotes whether those data items were ever read.

Figure 4:
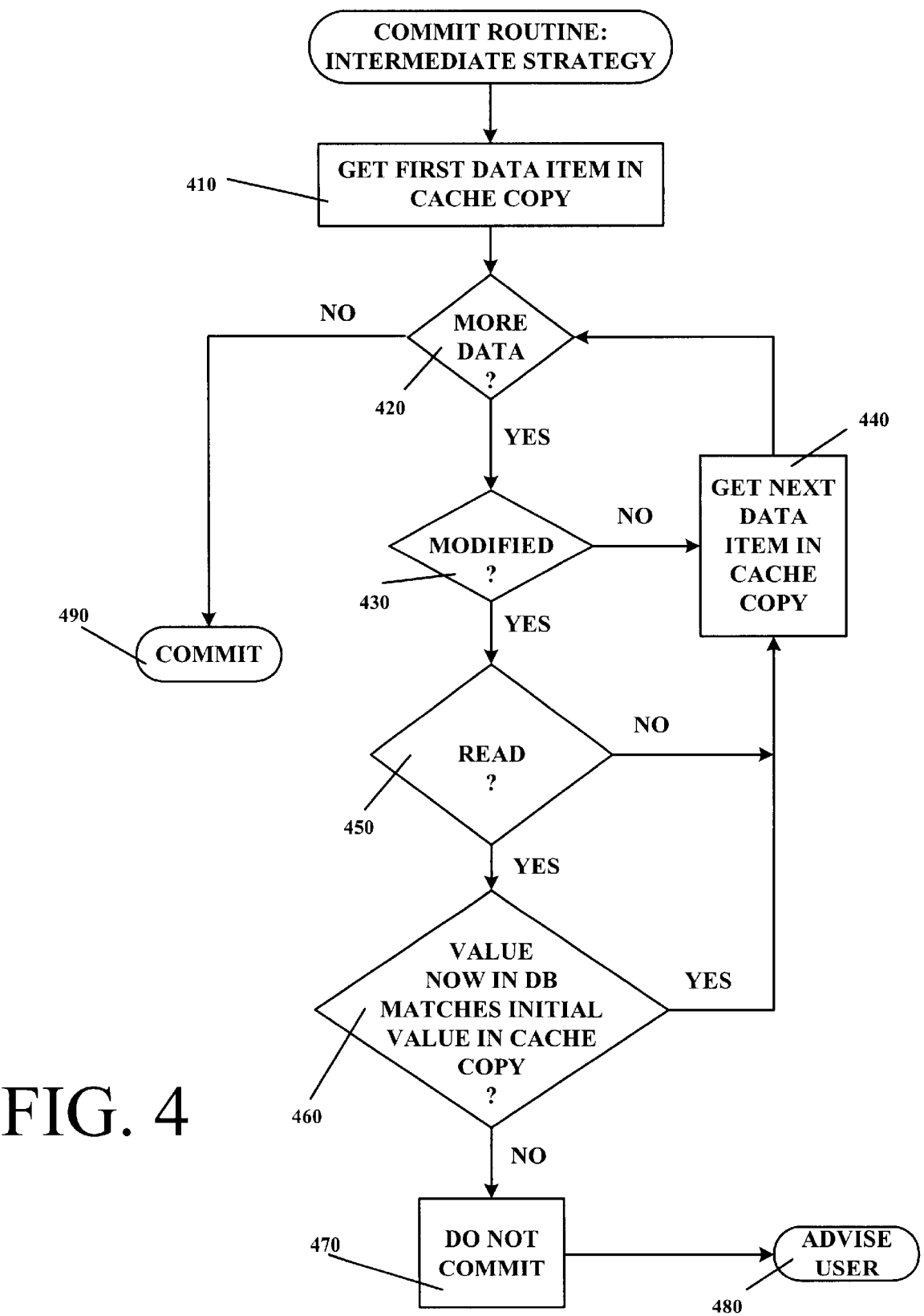
FIG. 4 is a flow diagram of an intermediate strategy for determining whether to comment an update in accordance with a second preferred embodiment of the invention.

The intermediate strategy operates substantially as described above in connection with FIG. 3, except for the test using bit B3 at step 450 of FIG. 4. FIG. 4 illustrates the intermediate strategy, but is not discussed in detail because its operation can be understood from the following example.

If we again consider the first example in which T2 commits first, the bits B1 and B3 for transaction T1 have the following values:

| T1 | | |
|----|----|----|
| A: | B1: False | B3: True |
| B: | B1: True  | B3: True |
| C: | B1: True  | B3: True |
| D: | B1: True  | B3: False |
| E: | B1: False | B3: False |

For the same transaction T1, a comparison of bits B2 and B3 reveals that bit B2, B:B2=True and C:B2=False whereas B:B3=True and C:B3=True. Thus, the difference in the computational logic of logical state bits B2 and B3 result in the complex strategy differentiating between (B and C) while the other strategy treats them the same. The result is that transaction T1, which seeks to update the database with new values for (B, C and D), cannot commit after transaction T2 under the intermediate strategy, as shown by the process flow of FIG. 4, because, (C) was modified (as tested at step 430) and read (as tested at step 450), but the value of (C) in the cache copy does not match the value of (C) presently in the database, as tested at step 460, because that value was changed by transaction T1. Although there was no reliance in transaction T1 on the value of (C) (that variable was modified prior to being read), the intermediate strategy rejects the transaction as conflicting because the initial value in the cache copy does not match the value now stored in the database.

The method of the present invention can be used to improve the throughput of any data caching architecture, by minimizing the update conflicts. Thus, the methodology can be advantageously employed in an object/relational caching software product, or as a routine within the caching layer of an application server product, such as AppServer 4.0, a product of Borland International, Inc., Scotts Valley, Calif., and later releases.

Consequently, more concurrency is achieved due to the elimination in false conflicts.

It should be understood that instead of bit B1, a determination as to whether data was modified can be made with reference to the value of the data item itself since we have a copy of the initial data. That technique, however, does not detect transient modifications in which a data item is changed to a new value and then changed back to its initial value.

While the present invention has been described with respect to a particularly preferred embodiment, the invention is susceptible to implementation in other ways which are within the spirit of the invention which is defined in terms of the recitations of the appended claims and equivalents thereof.

I claim:

1. In an optimistic concurrency database access scheme, a method for minimizing conflicts comprising the steps of:
    a) permitting multiple users to access a data record concurrently, the data record including data items having a stored value;
    b) generating concurrent cache copies of the data record for each user who accesses the data record, the cache copy including an initial value for each data item amongst a set of data items within the data record, the initial value being correlated to the stored value contained in the data record;
    c) permitting each user to perform a transaction on a respective cache copy by interacting with one or more data items in the cached copy, the interactions me including modifying or reading the data items;
    d) for each transaction, tracking which data items were modified and whether they were read; and
    e) for any transaction that includes modified data items, committing the transaction if no data item has been read, and committing the transaction if the data items that were read contain the same value as the initial value.

2. The method as in claim 1, wherein transactions are committed only if the data items that were read satisfy the further criterion that said data records were read before any modification.

3. The method as in claim 2, wherein the further criterion is satisfied in the event that there were no modifications.

4. The method as in claim 1, including the additional step of advising the user who created the transaction that the transaction failed to commit.

5. The method as in claim 1, wherein the cached copy of the set of data items includes all of the data items in the data record.

6. The method as in claim 1, wherein the tracking step comprises, for each data item, setting a first bit to indicate whether the data item was modified and a second bit to indicate whether the data item was read.

7. The method as in claim 6, wherein the logical state of the first bit is tested in determining whether the transaction includes modified data items.

8. The method as in claim 6, wherein the tracking step comprises, for each data item, setting a first bit to indicate whether the data item was modified and a second bit to indicate whether the data item was read before ever being modified.

9. The method as in claim 8, wherein the logical state of the first bit is tested in determining whether the transaction includes modified data items.

10. In an optimistic concurrency database access scheme, a method for minimizing conflicts comprising the steps of:
    a) permitting multiple users to access a data record concurrently, the data record including data items having a stored value;
    b) generating concurrent cache copies of the data record for each user who accesses the data record, the cache copy including an initial value for each data item amongst a set of data items within the data record, the initial value being correlated to the stored value contained in the data record;
    c) permitting each user to perform a transaction on a respective cache copy by interacting with one or more data items in the cached copy, the interactions including modifying or reading the data items;
    d) for each data item in the transaction, using a first bit to track whether the data item was modified and a second bit to track the occurrence of a first prescribed operation relative to a second prescribed operation on the data item; and
    e) for any transaction that includes modified data items, committing the transaction in response to at least one predetermined criterion.

11. The method as in claim 10, wherein the first prescribed operation is a read operation and the second prescribed operation is a modify operation.

12. The method as in claim 11, wherein the predetermined second bit item tracks whether the read operation occurs prior to any modify operation.

13. The method as in claim 11, wherein one predetermined criterion is that the data items that were read contain the same value as the initial value.

14. The method as in claim 13, wherein another predetermined criterion is that no data item has been read.

15. In an optimistic concurrency database access scheme, a method for minimizing conflicts comprising:
    a) a step for permitting multiple users to access a data record concurrently, the data record including data items having a stored value;
    b) a step for generating concurrent cache copies of the data record for each user who accesses the data record, the cache copy including an initial value for each data item amongst a set of data items within the data record, the initial value being correlated to the stored value contained in the data record;
    c) a step for permitting each user to perform a transaction on a respective cache copy by interacting with one or more data items in the cached copy, the interactions including modifying or reading the data items;
    d) for each transaction, a step for tracking which data items were modified and whether they were read; and
    e) for any transaction that includes modified data items, a step for committing the transaction if no data item has been read, and a step for committing the transaction if the data items that were read contain the same value as the initial value.

16. The method as in claim 15, wherein transactions are committed only if the data items that were read satisfy the further criterion that said data records were read before any modification.

17. The method as in claim 15, including the additional step of advising the user who created the transaction that the transaction failed to commit.

18. The method as in claim 15, wherein the tracking step comprises, for each data item, setting a first bit to indicate whether the data item was modified and a second bit to indicate whether the data item was read.

19. The method as in claim 18, wherein the logical state of the first bit is tested in determining whether the transaction includes modified data items.

20. The method as in claim 15, wherein the tracking step comprises, for each data item, setting a first bit to indicate whether the data item was modified and a second bit to indicate whether the data item was read before ever being modified.

21. The method as in claim 20, wherein the logical state of the first bit is tested in determining whether the transaction includes modified data items.

* * * * *